United States Patent [19]

Carey

[11] Patent Number: 4,995,239
[45] Date of Patent: Feb. 26, 1991

[54] LIQUID LINE SERVICE AND PROCESS DEVICE

[75] Inventor: Michael D. Carey, Holmen, Wis.

[73] Assignee: American Standard Inc., New York, N.Y.

[21] Appl. No.: 519,071

[22] Filed: May 4, 1990

[51] Int. Cl.⁵ ............................................. F25B 45/00
[52] U.S. Cl. ....................................... 62/149; 62/174; 62/292; 62/503
[58] Field of Search ................... 62/77, 149, 174, 292, 62/503

[56] References Cited

U.S. PATENT DOCUMENTS

| | | | |
|---|---|---|---|
| 2,341,430 | 2/1944 | Elsey | 62/77 |
| 2,565,416 | 8/1951 | Wittlin et al. | 62/292 |
| 3,753,356 | 8/1973 | Kramer | 62/292 X |
| 3,785,164 | 1/1974 | Wrenn, Jr. | 62/292 X |
| 3,875,756 | 4/1975 | Olson | 62/77 |
| 4,018,061 | 4/1977 | Williamitis | 62/125 |
| 4,474,034 | 10/1984 | Avery, Jr. | 62/503 |
| 4,528,826 | 7/1985 | Avery, Jr. | 62/503 |
| 4,614,087 | 9/1986 | Nadamoto et al. | 62/126 |
| 4,745,772 | 5/1988 | Ferris | 62/292 |

Primary Examiner—Lloyd L. King
Attorney, Agent, or Firm—William J. Beres; William O'Driscoll

[57] ABSTRACT

A liquid line service and process device for use in the liquid line of a refrigeration system comprising a housing respectively including an inlet, a filter core and an outlet forming a refrigerant flow path through the housing. The housing also includes an access port, means for connecting the access port to the refrigerant flow path, a moisture indicator in the refrigerant flow path, and means for controlling the flow of refrigerant in the flow path.

11 Claims, 3 Drawing Sheets

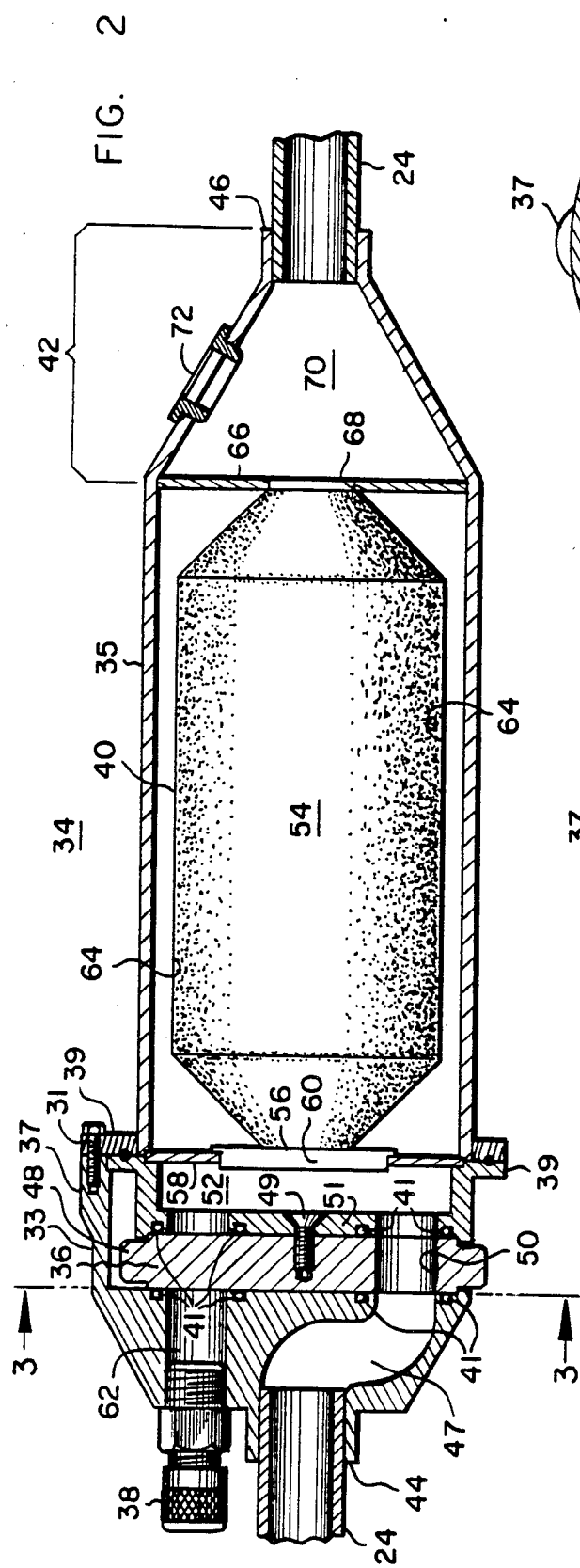
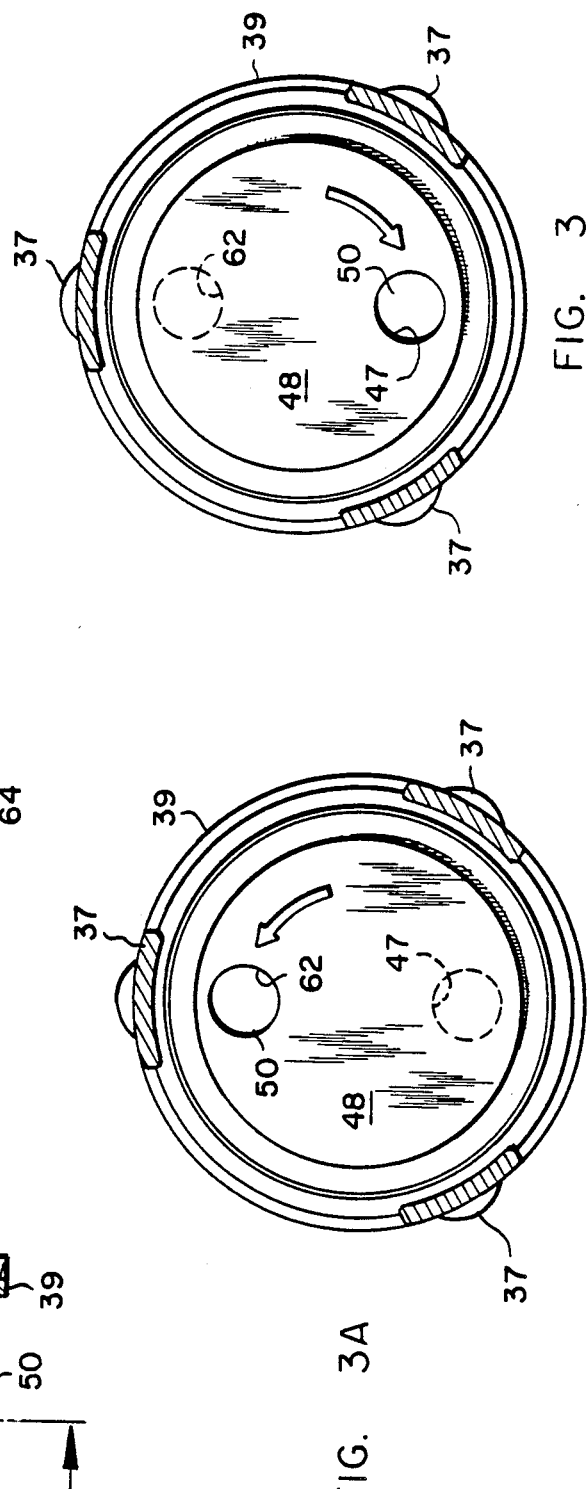

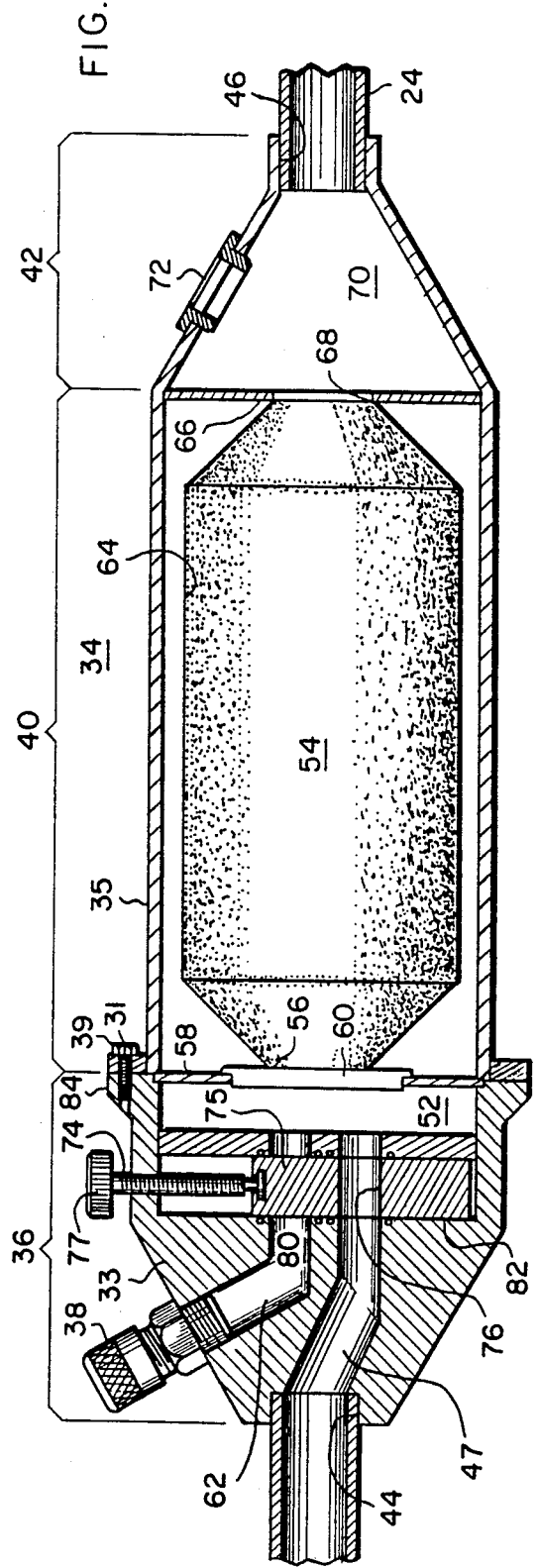

LIQUID LINE SERVICE AND PROCESS DEVICE

BACKGROUND OF THE INVENTION

The present invention is directed to refrigeration systems and more particularly to a single liquid line service and process device combining a refrigerant filter, an access port, a flow controller and a moisture indicator.

In refrigeration systems, a heat exchanger such as an evaporator transfers heat from a first fluid such as air to a refrigerant in the evaporator. Absorbing the transferred heat from the first fluid vaporizes the refrigerant. The vaporized refrigerant is delivered via a suction line to a compressor where the compressor increases the pressure of the refrigerant vapor to a point where its condensing temperature is above the temperature of water available for condensing purposes. The pressurized refrigerant vapor is passed from the compressor via a hot gas line to a condenser where the heat contained in the pressurized refrigerant vapor is transferred to another cooler medium such as water. The vapor condenses back to a liquid refrigerant during this process and passes along a liquid line through an expansion valve back to the evaporator. The expansion valve separates the high pressure part of the system maintained by the compressor from the low pressure part of the system where refrigerant is vaporized by allowing only as much liquid to pass through the expansion valve as the evaporator can vaporize.

A number of devices are provided in the liquid line between the condenser and the expansion valve to control and maintain the refrigeration system. These devices generally include, in order from the condenser, a liquid line shutoff valve, an access port generally used to charge the refrigeration system, a filter/drier to remove contaminants and moisture from the refrigerant, and a moisture indicator such as a sight glass to monitor refrigerant state which indicates loss of charge or clogging of the filter/drier.

In the past, four separate devices have been required to provide these four separate functions. Combining these previously distinct elements into a single device provides substantial advantages in the form of inventory control and management, as well as in reducing the physical dimensions and number of connections in the liquid line. Additionally, maintenance of a single device is generally much easier than maintaining multiple distinct devices.

A number of previous patents have attempted to combine several of these elements into a single device but none has been able to combine all four into a single device. For instance, U.S. Pat. No. 4,018,061 shows a filter/drier which includes a sight glass and an expansion valve. U.S. Pat. No. 4,528,826 and U.S. Pat. No. 4,474,034 each disclose the combination of a charge port, a drier/filter, and a sight glass. U.S. Pat. No. 4,614,087 discloses a filter/drier in combination with a high pressure safety switch and a sight glass. However, none of these patents have been able to combine a filter/drier, a charge port, a refrigerant flow control and a moisture indicator into a single device.

BRIEF SUMMARY OF THE INVENTION

It is an object of the present invention to solve the problems of the prior art.

It is a further object of the present invention to combine the functions of a filter/drier, a charge port, a refrigerant flow control device, and a moisture indicator into a single unified device.

The present invention provides a liquid line service and process device for use in the liquid line of a refrigeration system. The device comprises a housing respectively including an inlet, a filter core and an outlet forming a refrigerant flow path through the housing. The housing also includes an access port, means for connecting the access port to the refrigerant flow path, a moisture indicator in the refrigerant flow path, and means for controlling the flow of refrigerant in the flow path.

The present invention provides the combination of an external access port, a line control device, a filter/drier, and a moisture indicator into a unitary device for use in a refrigeration system.

The present invention also provides a liquid line service and process device for use in the liquid line of a refrigeration system. The device has a housing including an inlet for connection to the liquid line of a refrigeration system; an access port for allowing external access to the liquid line; a filter/drier core for filtering and removing moisture refrigerant in the liquid line; and a line control device connected to the inlet, the access port and the filter/drier core. The line control device includes a multiposition valve or process dial for opening an inlet passage between the inlet and the filter/drier core, and for opening an access passage between the access port and the filter/drier core. The housing of the device also includes an outlet for connecting the device to the liquid line of a refrigeration system; and an outlet passage connecting the filter/drier core to the outlet, where the outlet passage includes a sight glass for monitoring the refrigerant.

BRIEF DESCRIPTION OF THE DRAWINGS

FIG. 2 is a plan view of the unitary device according to the invention.

FIG. 3 is a cross sectional view of the unitary device taken along line 3—3 of FIG. 2 and showing the line control device of FIG. 2 in its first position.

FIG. 3A is a cross-sectional view of the unitary device taken along line 3—3 of FIG. 2 and showing the line control device of FIG. 2 in its second position.

FIG. 4 is a plan view of a second embodiment of the unitary device of the invention.

FIG. 5 is a plan view of a third embodiment of the unitary device of the present invention.

DETAILED DESCRIPTION

Figure 1:
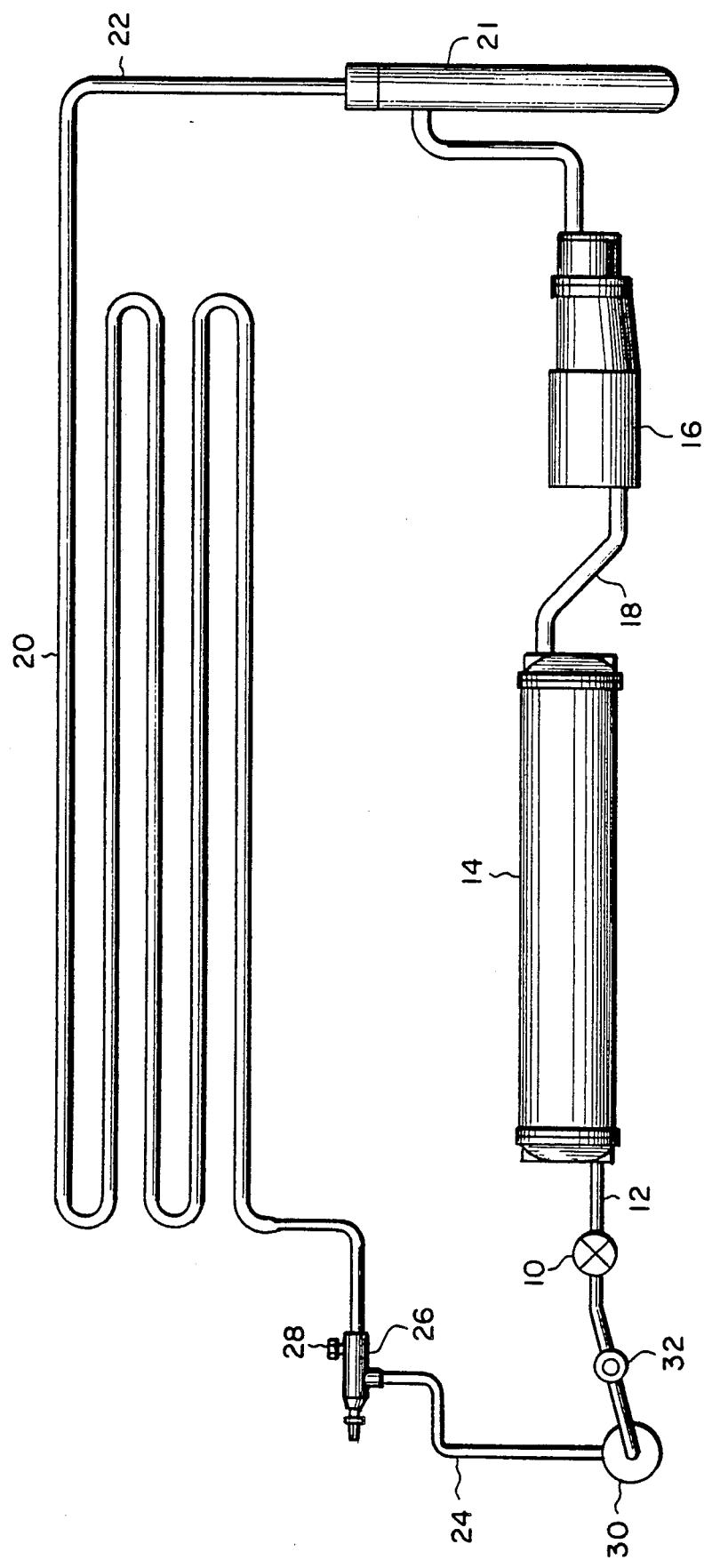
FIG. 1 is a perspective view of a prior art refrigeration system.

FIG. 1 shows a prior art refrigeration system including an expansion valve 10 connected by a refrigerant line 12 to an evaporator 14. The expansion valve 10 controls the amount of refrigerant admitted to the evaporator 14. The evaporator 14 is connected to a compressor 16 by means of a suction line 18, and the compressor 16 is connected to a condenser 20 by a hot gas line 22. An oil separator 21 is included in the hot gas line 22 between the compressor 16 and the condenser 20. A liquid line 24 connects the condenser 20 back to the expansion valve 10. The liquid line 24 includes a line control device 26 such as a Hamilton-pax service valve for shutting off the flow of refrigerant in the system, and an access port 28 such as a Schraeder fitting for allowing, among other things, the addition or removal of refrigerant from the system. The liquid line also includes a filter/drier 30 such as those sold by the Sporlan Valve Company of St. Louis, Mo. under Sporlan's "CATCH-ALL ®" trademark for removing moisture and impurities from the refrigerant, and a moisture indicator 32 such as those sold by the Sporlan Valve Company of St. Louis, Mo. under Sporlan's "SEE-ALL ®" trademark for providing a visual state or refrigerant indicating that the filter/drier 30 is clogged or some other problem (i.e., low in charge) and that there is moisture in the refrigerant.

FIG. 2 shows the invention, which incorporates into a unitary device 34 the previously separate liquid line elements of a liquid line controller 36, an access port 38, a filter/drier 40 and a moisture indicator 42. The access port 38 is shown as a Schraeder fitting, though any conventional access or charge port can be used. The unitary device 34 is located in the liquid line 24 of the refrigeration system. The unitary device 34 has an inlet 44 conventionally connected by the liquid line 24 to the condenser 20, and an outlet 46 conventionally connected by the liquid line 24 to the expansion valve 10.

In the embodiment shown in FIG. 2, the unitary device 34 has two parts, a line control housing 33, and a filter core housing 35. The moisture indicator 42 and the filter/drier 40 are contained in the filter core housing 35, while the line control device 36 and the access port 38 are contained in the line control housing 33. The line control device includes three projections 37 which extend over the liquid line controller 36 to engage a flange 39 of the filter core housing 35. Screws 31 join the flange 39 to each of the projections 37 and thus combine the filter core housing 35 and the line control housing 33 into the unitary device 34. Various seals 41 are provided to seal the unitary device 34.

The liquid line control element 36 is shown in the embodiment of FIG. 2 and 3 as a rotating process dial 48 which includes an aperture 50. A single screw 49 is shown mounting the process dial 48 to an extension 51 of the unitary device 34 although other arrangements for rotatably mounting the process dial 48 are contemplated.

The process dial 48 is rotatably mounted by the screw 51 in the unitary device 34 so that the aperture 50 can be rotated between several positions. As shown in FIG. 3, the process dial 48 can be rotated to a first position to allow the aperture 50 to connect the inlet 44 by means of an inlet passage 47 to a cavity 52 which provides access to a filter/drier core 54. Additionally, as shown in FIG. 3a, the process dial 48 can be rotated to a second position so that the aperture 50 connects the access port 38 by means of an access passage 62 to the cavity 52 and the core 54. In the second position the process dial 48 blocks the inlet passage 47, while in the first position the process dial 48 blocks the access passage 62. The process dial 48 can also be rotated to a third position where the aperture 50 does not provide access to the cavity 52, thus blocking the liquid line 24 of the refrigeration system.

Access from the cavity 52 to the core 54 is provided through an entrance opening 56 in an entrance bulkhead 58, the bulkhead 58 otherwise restricting refrigerant flow to the core 54. A fine mesh particle screen 60 for filtering large particles from the refrigerant is a part of the opening 56.

The unitary device 34 includes a core housing 64 which supports the core 54 within the unitary device 34. The core housing 64 contains the refrigerant to ensure that all of the refrigerant is filtered and/or dried by the core 54. A second bulkhead 66 retains core 54 at the outlet end of the device. The second bulkhead 66 has an exit opening 68 which allows the refrigerant to exit the device 34 through an exit cavity 70 connected to the outlet 46. The moisture indicator 42 in this embodiment comprises a sight glass 72 for visually monitoring the refrigerant and is located in the exit cavity 70. Alternative moisture indicators 42 such as hydrosensitive and photosensitive indicators are also contemplated.

In normal operation a refrigerant flow path through the unitary device 34 is formed by the inlet 44, the inlet passage 47, the aperture 50, the cavity 52, the opening 56, the core 54, the opening 68, the cavity 70 and the outlet 46. When the process dial 48 is rotated to the second position, the path through the unitary device 34 is formed by the access port 38, the access passage 62, the aperture 50, the cavity 52, the opening 56, the core 54, the opening 68, the cavity 70 and the outlet 46. When the process dial 48 is rotated to the third position, all flow through the unitary device 34 is blocked.

FIG. 4 shows a further embodiment of the unitary device 34 where the line controller element 36 includes a valve 74 instead of a process dial. The valve 74 includes a valve body 75 having a through passage 76 as well as a knob 77 which moves the valve body 75 vertically when the knob 77 is rotated. The valve body 75 is moveable to at least three positions including a first position which connects the inlet passage 47 by means of valve passage 76 to the cavity 52, a second position where the valve passage 76 connects the access passage 62 to the cavity 52, and a third position where portions of the valve body 80 and 82 respectively block the access passage 62 and the inlet passage 47. In a manner similar to the operation of the process dial 48, the valve body portion 80 will block the access passage 62 when the valve 74 is in the first position, and the valve body portion 82 will block the inlet passage 47 when the valve 74 is in the second position. The seals 41 prevent leakage. In this embodiment the line control housing 33 has a flange 84 which is fastened by screws 31 to the flange 39 of the filter/drier housing 35. The remainder of this embodiment is essentially similar to that shown in FIG. 3.

FIG. 5 shows an alternative embodiment which is semi-hermetic. In this embodiment the unitary device 34 may be opened at the flanges 39 and 84 as well as of a flange 78, and the core 54 removed and replaced if clogged or dirty. The liquid line control device 36 is located at the inlet 44, and is shown as a ball valve 79 with only two operable positions. In the first operable position an aperture 81 in the process dial 48 provides access between the inlet 44 and the cavity 52 while in the second position the inlet 44 is blocked by the ball valve 79. A knob 83 on the ball valve 79 controls whether the ball valve 79 is in the first or second position. The cavity 52 connects both the access port 38, and the inlet 44 by means of the ball valve 79, to the entrance opening 56 of the core 54. The access port 38 in this embodiment is a self closing device such as a Schraeder fitting 84 which will not allow the addition or removal of refrigerant to the system unless the fitting 84 is actuated. The remainder of this embodiment is essentially similar to the previous embodiments.

Although the preferred embodiments are described above, it will be apparent that other components and arrangements thereof could equally well be used with the subject invention, as for example, including a temperature sensor or locating the components in a different order. Additionally, the access port could be used to read system pressure, to remove refrigerant, or to allow a control device to interface with the system. These and other modifications to the embodiments disclosed above will be apparent to those skilled in the art within the scope of the following claims.

I claim:

1. A liquid line service and process device for use in the liquid line of a refrigeration system comprising:
a housing, respectively including an inlet, a filter core and an outlet forming a refrigerant flow path through the housing; the housing also including an access port, means for connecting the access port to the refrigerant flow path, a moisture indicator in the refrigerant flow path, and means for controlling the flow of refrigerant in said flow path.

2. The system of claim 1 where said flow control means is located between the inlet and the filter core, and the access port is located in proximity to the inlet.

3. The system of claim 2 where the flow control device is adjustable between at least a first position where the refrigeration flow path is open and a second position where the refrigerant flow path is blocked.

4. The system of claim 3 where the control means is adjustable to a third position connecting the access port to the refrigerant flow path.

5. The system of claim 4 where the flow control means includes a process dial or a valve.

6. The system of claim 3 where the flow control means includes a valve or a process dial.

7. The system of claim 1 wherein the filter core is removable.

8. The system of claim 1 wherein the moisture indicator includes a sight glass.

9. The system of claim 1 wherein the access port includes a Schraeder fitting.

10. A liquid line service and process device for use in the liquid line of a refrigeration system comprising a housing including:
an inlet for connection to the liquid line of a refrigeration system;
an access port for allowing external access to the liquid line;
a filter/drier core for filtering refrigerant and removing moisture in the liquid line;
a line control device connected to the inlet, the access port and the filter/drier core, the line control device including first means for opening an inlet passage between the inlet and the filter/drier core, and second means for opening an access passage between the access port and the filter/drier core;
an outlet for connecting the device to the liquid line of a refrigeration system; and
an outlet passage connecting the filter/drier core to the outlet, the outlet passage including a sight glass for monitoring the refrigerant.

11. The device of claim 10 wherein the line control device further includes means for blocking the liquid line of the refrigeration system.

* * * * *